United States Patent
Li

(10) Patent No.: US 12,503,717 B2
(45) Date of Patent: Dec. 23, 2025

(54) SYSTEMS AND METHODS FOR MODELING DISEASE AND ASSESSING ADVERSE SIDE EFFECTS OF THERAPEUTICS THEREFOR

(71) Applicant: NOVOHEART INTERNATIONAL LIMITED, Kowloon (HK)

(72) Inventor: Ronald A. Li, Hong Kong (CN)

(73) Assignee: NOVOHEART INTERNATIONAL LIMITED, Kowloon (HK)

( * ) Notice: Subject to any disclaimer, the term of this patent is extended or adjusted under 35 U.S.C. 154(b) by 1034 days.

(21) Appl. No.: 16/324,421

(22) PCT Filed: Aug. 11, 2017

(86) PCT No.: PCT/IB2017/001130
§ 371 (c)(1),
(2) Date: Feb. 8, 2019

(87) PCT Pub. No.: WO2018/029535
PCT Pub. Date: Feb. 15, 2018

(65) Prior Publication Data
US 2019/0169670 A1    Jun. 6, 2019

Related U.S. Application Data

(60) Provisional application No. 62/373,748, filed on Aug. 11, 2016.

(51) Int. Cl.
| | | |
|---|---|---|
| *C12Q 1/02* | (2006.01) | |
| *A61K 31/496* | (2006.01) | |
| *A61K 31/519* | (2006.01) | |
| *A61P 9/06* | (2006.01) | |
| *C12N 5/00* | (2006.01) | |
| *C12N 5/077* | (2010.01) | |
| *G01N 33/50* | (2006.01) | |

(52) U.S. Cl.
CPC ............ *C12Q 1/025* (2013.01); *A61K 31/496* (2013.01); *A61K 31/519* (2013.01); *A61P 9/06* (2018.01); *C12N 5/0068* (2013.01); *C12N 5/0657* (2013.01); *G01N 33/5014* (2013.01); *G01N 33/5061* (2013.01); *C12Q 2600/142* (2013.01); *G01N 2800/326* (2013.01); *Y02A 50/30* (2018.01)

(58) Field of Classification Search
CPC ............ C12Q 1/025; C12Q 2600/142; A61K 31/496; A61K 31/519; A61P 9/06; C12N 5/0068; C12N 5/0657; G01N 33/5014; G01N 33/5061; G01N 2800/326; G01N 33/5044; Y02A 50/30
See application file for complete search history.

(56) References Cited

U.S. PATENT DOCUMENTS

| | | | | |
|---|---|---|---|---|
| 2006/0136028 A1* | 6/2006 | Ross | ................... | A61N 1/0587 607/129 |
| 2012/0027807 A1* | 2/2012 | Chien | ..................... | A61P 9/00 435/325 |
| 2012/0142556 A1* | 6/2012 | Parker | ............... | G01N 33/5032 506/10 |
| 2014/0342445 A1* | 11/2014 | Ingber | ................... | C12M 23/16 435/294.1 |
| 2014/0349332 A1 | 11/2014 | Yasuda et al. | | |
| 2015/0125952 A1* | 5/2015 | Kim | ..................... | C12N 5/0657 435/396 |
| 2015/0353894 A1* | 12/2015 | Li | ........................ | C12N 5/0657 435/377 |

FOREIGN PATENT DOCUMENTS

| | | |
|---|---|---|
| CN | 103987854 A | 8/2014 |
| CN | 104931683 A | 9/2015 |
| CN | 104974937 A | 10/2015 |
| WO | WO-2014/116874 A1 | 7/2014 |
| WO | WO-2015/003064 A2 | 1/2015 |

OTHER PUBLICATIONS

Microfabrication, What is Microfabrication, Webpage, Jul. 17, 2017, https://monroeengineering.com/blog/what-is-microfabrication/ (Year: 2017).*
Sharma et al., Cardiac Troponins, J. Clin. Pathol. 2004; 57:1025-1026 (Year: 2004).*
Motlagh et al., Microfabricated grooves recapitulate neonatal myocyte connexin43 and N-cadherin expression and localization, J. Biomed. Mater. Res. 67A: 148-157, 2003 (Year: 2003).*
Shum et al., A Micropatterned Human Pluripotent Stem Cell-Based Ventricular Cardiac Anisotropic Sheet for Visualizing Drug-Induced Arrhythmogenicity, Adv. Mater., 29(1) (Jan. 2017).
European Patent Application No. 17838868, Extended European Search Report, dated Feb. 28, 2020.
Brown, "Drugs, hERG and sudden death," Cell Calcium 35:543-547 (2004).
Chen et al., "Shrink-Film Configurable Multiscale Wrinkles for Functional Alignment of Human Embryonic Stem Cells and their Cardiac Derivatives," Advanced Materials 23:5785-5791 (2011).
De Ponti et al., "Safety of Non-Antiarrhythmic Drugs that Prolong the QT Interval or Induce Torsade de Pointes," Drug Safety 25:263-286 (2002).

(Continued)

*Primary Examiner* — Satyendra K Singh
(74) *Attorney, Agent, or Firm* — MARSHALL, GERSTEIN & BORUN LLP

(57) ABSTRACT

The disclosure provides a substrate for the ordered growth and development of cardiomyocytes such as ventricular cardiomyocytes derived from pluripotent stem cells along with methods of culturing the cells on the substrates for use in assays such as cardiotoxicity assays. Further provided are methods for assessing cardiotoxicity using one or more criteria disclosed herein.

13 Claims, 15 Drawing Sheets

(56) References Cited

OTHER PUBLICATIONS

Eckardt et al., "Experimental models of torsade de pointes," Cardiovascular Research 39:178-193 (1998).
Enger et al., "Serious ventricular arrhythmias among users of cisapride and other TQ-prolonging agents in the United States," Pharmacoepidemiology and Drug Safety 11:477-486 (2002).
Gibson et al., "Human stem cell-derived cardiomyocytes detect drug-mediated changes in action potentials and ion currents," Journal of Pharmacological and Toxicological Methods 70:255-267 (2014).
Gintant, "An evaluation of hERG current assay performance: Translating preclinical safety studies to clinical QT prolongation," Pharmacology & Therapeutics 129:109-119 (2011).
Gintant, "Preclinical Torsades-de-Pointes Screens: Advantages and limitations of surrogate and direct approaches in evaluating proarrhythmic risk," Pharmacology & Therapeutics 119:199-209 (2008).
Hawwa et al., "Ranolazine: Clinical Applications and Therapeutic Basis," Am J Cardiovas Drugs 13:5-16 (2013).
Hennessy et al., "Cisapride and ventricular arrhythmia," British Journal of Clinical Pharmacology 66:375-385 (2008).
Hondeghem et al., "Instability and Triangulation of the Action Potential Predict Serious Proarrhythmia, but Action Potential Duration Prolongation Is Antiarrhythmic," Circulation 103:2004-2013 (2001).
Hondeghem, "QT prolongation is an unreliable predictor of ventricular arrhythmia," Heart Rhythm Society 5:1210-1212 (2008).
International Search Report and Written Opinion from International Application No. PCT/IB2017/001130 dated Jan. 5, 2018.
Janse et al., "Animal models of cardiac arrhythmias," Cardiovascular Research 39:165-177 (1998).
Jonsson et al., "Improvement of cardiac efficacy and safety models in drug discovery by the use of stem cell-derived cardiomyocytes," Expert Opinion on Drug Discovery 4:357-372 (2009).
Liu et al., "Functional Sarcoplasmic Reticulum for Calcium Handling of Human Enbryonic Stem Cell-Derived Cardiomyocytes: Insights for Driven Maturation," Stem Cells 25:3038-3044 (2007).
Lui et al., "Induced pluripotent stem cells as a disease model for studying inherited arrhythmias: promises and hurdles," Drug Discovery Today: Disease Models 9:e199, 9 pages (2012).
Luna et al., "Multiscale Biomimetic Topography for the Alignment of Neonatal and Embryonic Stem Cell-Derived Heart Cells," Tissue Engineering. Part C, 17:579-588 (2011).
Ma et al., "Three Dimension Filamentous Human Cardiac Tissue Model," Biomaterials 35: 1367-1377 (2014).
Monahan et al., "Torsades de Pointes Occurring in Association with Terfenadine Use," JAMA 264(21): 2788-2790 (1990).
Paul et al., "How to improve R&D productivity: the pharmaceutical industry's grand challenge," Nat Rev Drug Discov 9:203-214 (2010).
Peng et al., "The action potential and comparative pharmacolog of stem cell-derived human cardiomyocytes,", Journal of Pharmacological and Toxicological Methods 61:277-286 (2010).
Poon et al., "Proteomic Analysis of Human Pluripotent Stem Cell-Derived, Fetal, and Adult Ventricular Cardiomyocytes Reveals Pathways Crucial for Cardiac Metabolism and Maturation," Circ Cardiovasc Genet 427-436 (2015).
Redfern et al., "Relationships between preclinical electrophysiology, clinical TQ interval prolongation and torsade de pointes for a broad range of drugs: evidence for a provisional safety margin in drug development," Cardiovascular Research 58:32-45 (2003).
Regenthal et al., "Drug Levels: Therapeutic and Toxic Serum/Plasma Concentrations of Common Drugs," J Clin Monit Comput 15:529-544 (1999).
Scheel et al., "Action Potential Characterization of Human Induced Pluripotent Stem Cell-Derived Cardiomyocytes Using Automated Patch-Clamp Technology," Assay and Drug Development Technologies 12:457-469 (2014).
Shah et al., "Refining detection of drug-induced proarrhythmia: QT interval and TRIaD," Heart Rhythm Society 2(7):758-772 (2005).
Stevens et al., "The future of drug safety testing: expanding the view and narrowing the focus," Drug Discovery Today 14:162-167 (2009).
Tamargo et al., "Safety of Flecainide," Drug Safety 35:273-289 (2012).
Wang et al., "Effect of engineered anisotropy on the susceptibility of human pluripotent stem cell-derived ventricular cardiomyocytes to arrhythmias," Biomaterials 34:8878-8886 (2013).
Watkins, "Drug Safety Sciences and the Bottleneck in Drug Development," Nature 89(6):788-790 (2011).
Weng et al., "A Simple, Cost-Effective but Highly Efficient System for Deriving Ventricular Cardiomyocytes from Human Pluripotent Stem Cells," Stem Cells and Development 23:1704-1716 (2014).
Woosley et al., "Mechanism of the Cardiotoxic Actions of Terfenadine," JAMA 269(12):1532-1536 (1993).

* cited by examiner

A

B

D

A n=13

B

17 % Re-entry n=6

SYSTEMS AND METHODS FOR MODELING DISEASE AND ASSESSING ADVERSE SIDE EFFECTS OF THERAPEUTICS THEREFOR

CROSS-REFERENCE TO RELATED APPLICATIONS

This application is a U.S. National Phase of PCT/IB17/01130, filed Aug. 11, 2017, which claims the priority benefit under 35 U.S.C. § 119 (e) of U.S. Provisional Application No. 62/373,748, filed Aug. 11, 2016, the disclosures of which are incorporated herein by reference in their entirety.

FIELD

The disclosure generally relates to the treatment of disorders and the characterization of therapeutics therefor. More specifically, the disclosure relates to in vitro assays for toxicities of potential or approved therapeutics, such as a cardiotoxicity associated with a potential or approved cardiac or non-cardiac therapeutic.

BACKGROUND

Cardiotoxicity remains a common leading cause responsible for 22% of drug attrition during phase I-III clinical trials and 45% of the drugs withdrawn from the US market between 1975 and 2007.[1, 2] In particular, torsades de pointes (TdP), a potentially lethal form of arrhythmias, is alone responsible for 33% of drug withdrawal.[1-3] Importantly, arrhythmogenicity presents a major concern in drug safety not only for cardiac drugs but also numerous others such as antihistamines, antimicrobials and antidepressants.[4] In addition to significant patient harm, a single late-phase attrition costs over $2 billion and 10 years.[5] Therefore, a sensitive and accurate pre-clinical testing platform is highly desirable. Although animal models are common, significant species differences exist (e.g., about 500 beats per minute and lack of a QT interval for mouse compared to humans). Conventional industrial standards of using immortalized transgenic Chinese Hamster Ovary (CHO) cells and human embryonic kidney (HEK293) cells that have been genetically modified to heterologously overexpress the single ion channel protein hERG (human Ether-h-go-go-Related Gene) for evaluating arrhythmogenicity are also highly sub-optimal because native heart cells carry a plethora of ion channels and pumps, leading to either the release of numerous unsafe drugs or faulty termination of otherwise useful candidates.[6-9] As such, human pluripotent stem cells (hPSC) that are proven to differentiate into genuine human cardiomyocytes (CMs) have been pursued as a better alternative for drug discovery and toxicity screening.[10, 11] Various lines of evidence indicate that patch-clamp experiments with hPSC-derived CMs (or hPSC-CMs) suffice to identify such pro-arrhythmic properties as action potential prolongation, early and delayed after-depolarization.[12-14] While these data provide an initial assessment, however, such single-cell traits are merely triggers or surrogates for multi-cellular arrhythmias, but by definition are not multi-cellular arrhythmias per se and do not provide such critical information as the incidence and threshold of occurrence. In fact, some results could even be misleading. As false negatives, single-cell assays cannot detect effects on cell-to-cell properties such as conduction; as false positives, a single-cell defect may not translate into sustained reentrant arrhythmic events due to compensatory responses within the system.

For the foregoing reasons, a need continues to exist in the art for in vitro screening assays that reliably and cost-effectively identify adverse effects of potential or existing therapeutics, such as toxicities, e.g., cardiotoxicities such as arrhythmias.

SUMMARY

Disclosed herein is a bio-hybrid material in the form of (1) human cardiomyocytes, such as hPSC-CMs (e.g., human ventricular cardiomyocytes), and (2) a microfabricated substrate providing an attachment point for the growth and ordered development of the human cardiomyocytes, as fundamental building blocks that have been strategically aligned by design. In use, the human cardiomyocytes form a monolayer of cells (termed the cardiac anisotropic sheet or CAS) plated on microfabricated substrates, which provide environments conducive to the development of the anisotropic properties characteristic of human cardiac cells in vivo. An example of such a bio-hybrid would be a human cardiac anisotropic sheet (hCAS), composed of human cardiomyocytes, on a microfabricated substrate. Along with well-defined inclusion/exclusion quality-control criteria and algorithms, CAS platforms such as the CAS (e.g., hCAS, human atrial cardiac anisotropic sheet or haCAS, human ventricular cardiac anisotropic sheet or hvCAS) can reproduce key electrophysiological features of the native human heart, while minimizing the variability commonly seen in conventional electrophysiological assays of hPSC-CMs for systematic assessments of drug-induced arrhythmogenicity. The bio-hybrid material provides the significant benefit of making available in vitro assays that more accurately reflect in vivo physiological effects such as cardiotoxicity. With the bio-hybrid material, in vitro assays can be performed for, e.g., the cardiotoxic effects of existing or potential therapeutics for use in treating any cardiac arrhythmia, including but not limited to Long QT syndrome, Brugada syndrome, genetic heart disease, amyloidosis, progeria, diabetic coma, jellyfish intoxication, hyperthyroidism, Yellow Fever, Chagas disease, aortic valve regurgitation, prescription drug abuse leading to arrhythmia, Rett syndrome, myocarditis, tricuspid atresia, Lyme disease, Churg-Strauss syndrome, forms of heart disease or failure involving arrhythmia, enlarged heart, broken heart syndrome, thyroid nodules, atrioventricular canal defect, cholera, mitral valve stenosis, multiple system atrophy (MSA), snoring, mitral valve prolapse, amniotic fluid embolism, gangrene, aplastic anemia, congenital heart disease in adults, heat exhaustion, Graves' disease, cardiomyopathy, premature ventricular contractions, Bradycardia, fatigue, tachycardia, dizziness, or shortness of breath, as well as other non-cardiac diseases.

One aspect of the disclosure provides a method of assessing the cardiotoxicity of a compound comprising: (a) contacting an anisotropic layer of cardiac (e.g. ventricular) cells on a microfabricated substrate with a compound; (b) stimulating the anisotropic layer of cells at one or more points; (c) detecting an electrical signal propagation in the anisotropic layer of cells; and (d) determining whether the compound exhibits cardiotoxicity. The disclosure provides methods for assessing the cardiotoxicity of any compound or combination of compounds, including but not limited to the class 1A, 1B or 1C anti-arrhythmic compounds (e.g., procainamide, tocainide, and flecainide, respectively), to determine whether, and optionally the extent of, any cardiotoxic effect of the compound. In some embodiments, the anisotropic layer of cells comprises cardiomyocytes (e.g., ventricular cardiomyocytes) derived from a human. In some embodiments, the microfabricated substrate comprises grooves oriented along a single axis of the substrate.

In some embodiments, the grooves have similar dimensions. In some embodiments, the grooves have a width of 1-30 μm, including embodiments wherein the grooves have a width of 5-15 μm, such as wherein the grooves have a width of 15 μm. In some embodiments, the depth of the grooves is about 5 μm. In some embodiments, the spacing between grooves is about 5 μm.

Embodiments of this aspect of the disclosure exist wherein the microfabricated substrate is polystyrene. In some embodiments, the cardiac anisotropic layer of cells is stimulated at one point, such as wherein the stimulation is 5-30 volts with a pulse duration of 5-30 milliseconds. In an exemplary embodiment, the stimulation is 10 volts with a pulse duration of 10 milliseconds.

In some embodiments of this aspect of the disclosure, a compound is determined to exhibit cardiotoxicity if the compound induces a spiral electrical propagation wave in the anisotropic layer of cells. In some embodiments, the compound is a Class 1A, Class 1B or Class IC anti-arrhythmic compound.

Embodiments are also envisioned wherein the anisotropic layer of cardiac cells comprises cardiomyocytes (e.g., ventricular cardiomyocytes) that are at least 70% troponin $T^+$. In some embodiments, the anisotropic layer of cardiac cells does not exhibit a reentrant event in the absence of exposure to a compound. In some embodiments, the cardiac anisotropic layer of cardiac cells has undergone a programmed electrical stimulation, such as a programmed electrical stimulation comprising a train of eight S1 stimuli delivered at 1.5 Hertz (Hz) followed by a premature extra stimulus (S2) with S1-S2 interval initiated at 550 milliseconds (ms) and consecutively shortened in steps of 50 ms until capture fails, at which point the. S1-S2 interval is increased by 20 ms, followed by 2-ms decrements until the effective refractory period (ERP), defined as the maximum S1-S2 interval that failed to lead to AP propagation, is achieved. In some embodiments, the anisotropic layer of cardiac cells exhibits a progressive dose-dependent slowing of APD50 conduction velocity as exposure to a class IC anti-arrhythmic compound is progressively increased from 0.3-3 μM. In some embodiments, the anisotropic layer of cardiac cells exhibits a dose-dependent $APD_{90}$ prolongation in response to a class 1A anti-arrhythmic compound. In some embodiments, the anisotropic layer of cardiac cells exhibits at least a two-fold increase in reentrant events in response to a class 1A anti-arrhythmic compound. In some embodiments, the anisotropic layer of cardiac cells does not exhibit a dose-dependent $APD_{90}$ prolongation in response to a class 1B anti-arrhythmic compound. In some embodiments, the anisotropic layer of cardiac cells does not exhibit an increase in reentrant events in response to a class 1B anti-arrhythmic compound.

This aspect of the disclosure also comprehends a method of identifying cardiomyocytes (e.g., ventricular cardiomyocytes) suitable for use in an in vitro cardiotoxicity assay comprising: (a) contacting a cardiomyocyte derived from a pluripotent stem cell with a microfabricated substrate; and (b) identifying cardiomyocytes suitable for use in an in vitro cardiotoxicity assay as cardiomyocytes exhibiting at least two of the following properties: (i) a radiating conduction pattern with an anisotropic ratio of at least 1.8 in response to electrical point stimulation; (ii) at least 70% cardiac troponin T+; (iii) a maximum capturing frequency of at least 1.5 Hz; (iv) an absence of reentrant events in response to steady-state pacing from 0.5 Hz through to 3 Hz (10V, 10 ms) with 0.5 Hz increments until the loss of 1:1 capture; or (v) an absence of induced spiral waves in response to programmed electrical stimulation comprising a first train of eight electrical pulses (S1) followed by a second train of electrical pulses (S2) with progressively shortened S1-S2 intervals.

In some embodiments, the method may further comprise: (a) exposing the cardiomyocytes to a therapeutically effective amount of a class IC anti-arrhythmic compound; and (b) identifying the cardiomyocytes as suitable for use in an in vitro cardiotoxicity assay if the class IC anti-arrhythmic compound induced a dose-dependent slowing of signal conduction velocity. In some embodiments, the class IC anti-arrhythmic compound is flecainide.

In some embodiments, the method may further comprise: (a) exposing the cardiomyocytes to a therapeutically effective amount of a class 1A anti-arrhythmic compound; and (b) identifying the cardiomyocytes as suitable for use in an in vitro cardiotoxicity assay if the class 1A anti-arrhythmic compound induced a dose-dependent slowing of signal conduction velocity. In some embodiments, the class 1A anti-arrhythmic compound is procainamide.

In some embodiments, the method may further comprise: (a) exposing the cardiomyocytes to a therapeutically effective amount of a class 1B anti-arrhythmic compound; and (b) identifying the cardiomyocytes as suitable for use in an in vitro cardiotoxicity assay if the class 1B anti-arrhythmic compound does not induce a dose-dependent slowing of signal conduction velocity. In some embodiments, the class 1B anti-arrhythmic compound is tocainide.

In some embodiments, the method may further comprise: (a) exposing the cardiomyocytes to terfenadine; and (b) identifying the cardiomyocytes as suitable for use in an in vitro cardiotoxicity assay if the terfenadine does not induce a reentrant event at 100 nM concentration but increases the likelihood of a reentrant event by at least 1.2-fold relative to exposure to a physiologically inert control compound when the terfenadine is administered at 300 nM concentration.

In some embodiments, the method may further comprise: (a) exposing the cardiomyocytes to cisapride; and (b) identifying the cardiomyocytes as suitable for use in an in vitro cardiotoxicity assay if the cisapride increases the likelihood of a reentrant event by at least 2.7-fold relative to exposure to a physiologically inert control compound.

Another aspect of the disclosure is drawn to a method of producing an anisotropic layer of cardiac cells comprising: (a) dissociating pluripotent stem cell cultures of at least 80% confluence to yield individual cells; (b) culturing individual cells in suspension under hypoxic conditions of about 5% $O_2$ and about 5% $CO_2$ for about 8 days to yield cultured cells, wherein the culturing comprises: (i) incubating the cells in feeder-free cell culture medium for human embryonic stem cells and induced pluripotent stem cells (mTeSR™-1; Stemcell Technologies, Inc., cat. no. 85850) medium supplemented with 1-40 μM, e.g., 10 μM, Rho kinase inhibitor, 0.1-10 ng/ml, e.g., 1 ng/ml, bone morphogenetic protein-4 and 5-100 g/mL, e.g., 40 μg/mL, solubilized basement membrane matrix secreted by Engelbreth-Holm-Swarm mouse sarcoma cells (MATRIGEL: 354277; BD Biosciences) matrigel for about 24 hours; (ii) further incubating the cells in a serum-free medium specifically formulated to support the development of human hematopoietic cells in culture, including HSC and progenitor cells (StemPro®-34 SFM complete medium; Gibco, cat. no. 10639011) comprising 5-200 μg/mL, e.g., 50 μg/mL, ascorbic acid, 0.1-20 mM, e.g., 2 mM, L-alanyl-L-glutamine dipeptide (GlutaMAX™; 35050-061; Gibco), 1-40 ng/ml, e.g., 10 ng/ml, BMP4 and 1-40 ng/ml, e.g., 10 ng/ml, Activin-A for about 3 days; (iii) continuing to incubate the cells in the serum-free Gibco (StemPro®-34 SFM complete medium; cat. no. 10639011) medium comprising 5-200 µg/mL, e.g., 50 µg/mL, ascorbic acid, 0.1-20 mM, e.g., 2 mM, L-alanyl-L-glutamine dipeptide (GlutaMAX™; 35050-061; Gibco), and 0.5-50 µM, e.g., 5 µM of a Wnt inhibitor for about 3 days; (iv) transferring the cells to the serum-free Gibco medium (StemPro®-34 SFM complete medium; cat. no. 10639011) comprising 5-200 µg/mL, e.g., 50 µg/mL, ascorbic acid under normoxic (ambient $O_2$, 5% $CO_2$) conditions on day 8 to yield cardiospheres; (c) maintaining the cardiospheres in the serum-free Gibco medium (StemPro®-34 SFM complete medium; cat. no. 10639011) comprising 5-200 µg/mL, e.g., 50 µg/mL, ascorbic acid until day 15-22, with medium replenishment every 3-4 days; (d) dissociating the cardiospheres by exposure to 0.1-10 mg/mL, e.g., 1 mg/mL, collagenase for 10-120 minutes, e.g., 30 minutes, followed by exposure to 0.005-1.0%, e.g., 0.05%, trypsin for 1-120 minutes, e.g., 3 minutes; (e) seeding the cardiospheres onto a solubilized basement membrane matrix secreted by Engelbreth-Holm-Swarm mouse sarcoma cells (MATRIGEL; 354277: BD Biosciences)—coated microfabricated substrate to form an anisotropic layer of cardiac cells; (f) incubating the anisotropic layer of cardiac cells in high-glucose (at least 1 g/l e g 4.5 g/l) DMEM medium comprising 10% heat-inactivated fetal bovine serum, 0.1-5×, e.g., 1×, L-alanyl-L-glutamine dipeptide (GlutaMAX™: 35050-061; Gibco), and 0.1-10×, e.g., 1×, MEM non-essential amino acids for 2 days; and (g) replenishing the medium every 2 days with RPMI 1640 medium (supplemented with B27) for at least 7 days, thereby producing an anisotropic layer of cardiac cells. In some embodiments, the pluripotent stem cell cultures are human pluripotent stem cell cultures. In some embodiments, the pluripotent stem cell cultures are human induced pluripotent stem cell cultures. In some embodiments, the pluripotent stem cell cultures are dissociated with accutase. In some embodiments, the Wnt Inhibitor is IWR-1.

Yet another aspect of the disclosure is directed to a method of manufacturing a microfabricated substrate comprising: (a) generating an elastomeric mold using photolithography to yield a mold having a series of channels oriented along the same axis in which each channel is 3-10 µm deep and 2-50 µm wide with a spacing between channels of 3-10 µm; (b) embossing the features of step (a) onto plastic using heat to generate a substrate; (c) exposing the substrate to UVO treatment for about 8 minutes; and (d) producing the microfabricated substrate by sterilizing the substrate in a chemical sterilizing agent. In some embodiments, the elastomeric mold is a polydimethylsiloxane mold. In some embodiments, the depths of the channels are about the same, such as wherein the channel depth is about 5 m. In some embodiments, the widths of the channels are about the same, such as wherein the channel width is about 10 µm or about 15 µm. In some embodiments, the spacings between channels is about the same, such as wherein the channel spacing is about 5 µm.

The disclosure also provides systems that model cardiac disease useful in screening for therapeutics, assessing any cardiotoxic effect of a compound or investigating the disease process. In addition, the disclosure provides methods of screening for therapeutics, methods for assessing any cardiotoxic effect of a compound and method of investigating a cardiac disease process.

In an aspect, the disclosure provides a system that models a cardiac disease comprising a bio-hybrid material comprising: (a) human cardiomyocytes, and (b) a microfabricated substrate for cell attachment. The microfabricated substrate for cell attachment provides a substrate that supports the attachment of hPSCs, hPSC-CMs or cells derived therefrom, and allows for their growth and development into a cardiac anisotropic sheet (CAS), with anisotropic properties characteristic of human cardiac cells in vivo. In some embodiments, the cardiac disease is cardiac arrhythmia, including but not limited to Long QT syndrome, Brugada syndrome, genetic heart disease, amyloidosis, progeria, diabetic coma, jellyfish intoxication, hyperthyroidism, Yellow Fever, Chagas disease, aortic valve regurgitation, prescription drug abuse leading to arrhythmia, Rett syndrome, myocarditis, tricuspid atresia, Lyme disease, Churg-Strauss syndrome, forms of heart disease or failure involving arrhythmia, enlarged heart, broken heart syndrome, thyroid nodules, atrioventricular canal defect, cholera, mitral valve stenosis, multiple system atrophy (MSA), snoring, mitral valve prolapse, amniotic fluid embolism, gangrene, aplastic anemia, congenital heart disease in adults, heat exhaustion, Graves' disease, cardiomyopathy, premature ventricular contractions, Bradycardia, fatigue, tachycardia, dizziness, or shortness of breath. In some embodiments, the disease is a non-cardiac disease. In some embodiments, the cardiomyocytes are ventricular cardiomyocytes. In various embodiments, the system is used in methods in screening for therapeutics, in assessing any cardiotoxic effect of a compound or in investigating the disease process.

In accordance with the foregoing description, the disclosure provides a method of screening for a therapeutic for cardiac disease comprising (a) incubating an anisotropic layer of cardiac cells under conditions maintaining cell viability; (b) contacting the cardiac cells with a candidate therapeutic for cardiac disease; and (c) measuring the effect of the candidate therapeutic for cardiac disease on the cardiac cells, wherein the candidate therapeutic for cardiac disease is identified as a therapeutic for cardiac disease if the candidate therapeutic for cardiac disease reduces a symptom of a cardiac disease, such as an arrhythmia, in the cardiac cells. In some embodiments, the cardiac cells comprises a microfabricated substrate. The screening method of the disclosure is suitable for use with anisotropic layer of cardiac cells modeling any cardiac disease, including any cardiac arrhythmia, in turn including but not limited to, Long QT syndrome, Brugada syndrome, genetic heart disease, amyloidosis, progeria, diabetic coma, jellyfish intoxication, hyperthyroidism, Yellow Fever, Chagas disease, aortic valve regurgitation, prescription drug abuse leading to arrhythmia, Rett syndrome, myocarditis, tricuspid atresia, Lyme disease, Churg-Strauss syndrome, forms of heart disease or failure involving arrhythmia, enlarged heart, broken heart syndrome, thyroid nodules, atrioventricular canal defect, cholera, mitral valve stenosis, multiple system atrophy (MSA), snoring, mitral valve prolapse, amniotic fluid embolism, gangrene, aplastic anemia, congenital heart disease in adults, heat exhaustion, Graves' disease, cardiomyopathy, premature ventricular contractions, Bradycardia, fatigue, tachycardia, dizziness, or shortness of breath.

The disclosure also provides a method for assessing the cardiotoxic effect of a compound comprising (a) contacting an anisotropic layer of cardiac cells with a compound; and (b) measuring the cardiotoxic effect of the compound on the cardiac cells. In some embodiments, the cardiac cells are attached to a microfabricated substrate. In some embodiments, the cardiotoxic effect is an arrhythmia. In some embodiments, the anisotropic layer of cardiac cells comprises healthy cells or models a cardiac or non-cardiac disease, either genetically (hereditary) or through manipulation, such as by chemical, physical, and/or electrical induction. In some embodiments of the method, the cardiac disease is Long QT syndrome, Brugada syndrome, genetic heart disease, amyloidosis, progeria, diabetic coma, jellyfish intoxication, hyperthyroidism, Yellow Fever, Chagas disease, aortic valve regurgitation, prescription drug abuse leading to arrhythmia, Rett syndrome, myocarditis, tricuspid atresia, Lyme disease, Churg-Strauss syndrome, forms of heart disease or failure involving arrhythmia, enlarged heart, broken heart syndrome, thyroid nodules, atrioventricular canal defect, cholera, mitral valve stenosis, multiple system atrophy (MSA), snoring, mitral valve prolapse, amniotic fluid embolism, gangrene, aplastic anemia, congenital heart disease in adults, heat exhaustion, Graves' disease, cardiomyopathy, premature ventricular contractions, Bradycardia, fatigue, tachycardia, dizziness, or shortness of breath. In some embodiments, the cardiotoxic effect is an arrhythmia The disclosure further provides a method for investigating a cardiac disease process comprising (a) incubating a anisotropic layer of cardiac cells modeling a cardiac disease under conditions maintaining cell viability; (b) contacting the anisotropic layer of cardiac cells with a candidate modulator of the cardiac disease; and (c) measuring the effect of the candidate modulator on the anisotropic layer of cardiac cells, wherein the candidate modulator of cardiac disease is identified as a modulator of the cardiac disease if the candidate modulator produces a variation in a symptom of the cardiac disease, such as an arrhythmia. Any of the cardiac diseases disclosed herein is suitable for use in the method, including but not limited to any arrhythmia, such as Long QT syndrome, Brugada syndrome, genetic heart disease, amyloidosis, progeria, diabetic coma, jellyfish intoxication, hyperthyroidism, Yellow Fever, Chagas disease, aortic valve regurgitation, prescription drug abuse leading to arrhythmia, Rett syndrome, myocarditis, tricuspid atresia, Lyme disease, Churg-Strauss syndrome, forms of heart disease or failure involving arrhythmia, enlarged heart, broken heart syndrome, thyroid nodules, atrioventricular canal defect, cholera, mitral valve stenosis, multiple system atrophy (MSA), snoring, mitral valve prolapse, amniotic fluid embolism, gangrene, aplastic anemia, congenital heart disease in adults, heat exhaustion, Graves' disease, cardiomyopathy, premature ventricular contractions, Bradycardia, fatigue, tachycardia, dizziness, or shortness of breath. In a related aspect, the disclosure provides a method of investigating a non-cardiac disease comprising (a) incubating an anisotropic layer of cardiac cells under conditions maintaining cell viability; (b) contacting the anisotropic layer of cardiac cells with a candidate modulator of the disease; and (c) measuring the effect of the candidate modulator on the anisotropic layer of cardiac cells, wherein the candidate modulator of the disease is identified as a modulator of the disease if the candidate modulator produces a variation in a symptom of the disease. In some embodiments of either of the aspects disclosed in this paragraph, the candidate modulator is a known cardiac therapeutic. In some embodiments of either aspect described in this paragraph, the anisotropic layer of cardiac cells is attached to a microfabricated substrate.

Embodiments of each of the above aspects of the disclosure comprise the use of ventricular cardiac cells or ventricular cardiomyocytes as exemplary cardiac cells or cardiomyocytes, respectively.

Other features and advantages of the disclosure will be better understood by reference to the following detailed description, including the drawing and the examples.

DETAILED DESCRIPTION

A novel cardio-mimetic bio-hybrid material comprising human cardiomyocytes developing on a micro-grooved substrate created using micro-patterning techniques is disclosed. The human cardiomyocytes form a cardiac anisotropic sheet (CAS) or layer of cells strategically aligned with guidance provided by the microfabricated substrate. Along with well-defined inclusion/exclusion quality-control criteria and algorithms, the disclosed CAS platform reproduces key electrophysiological features of the native human heart (e.g., anisotropy) while minimizing the variability commonly seen in conventional assays, thereby providing a new tool permitting an improved approach to assess arrhythmogenic risks via direct visualization for drug discovery or disease modeling.

Figure 1:
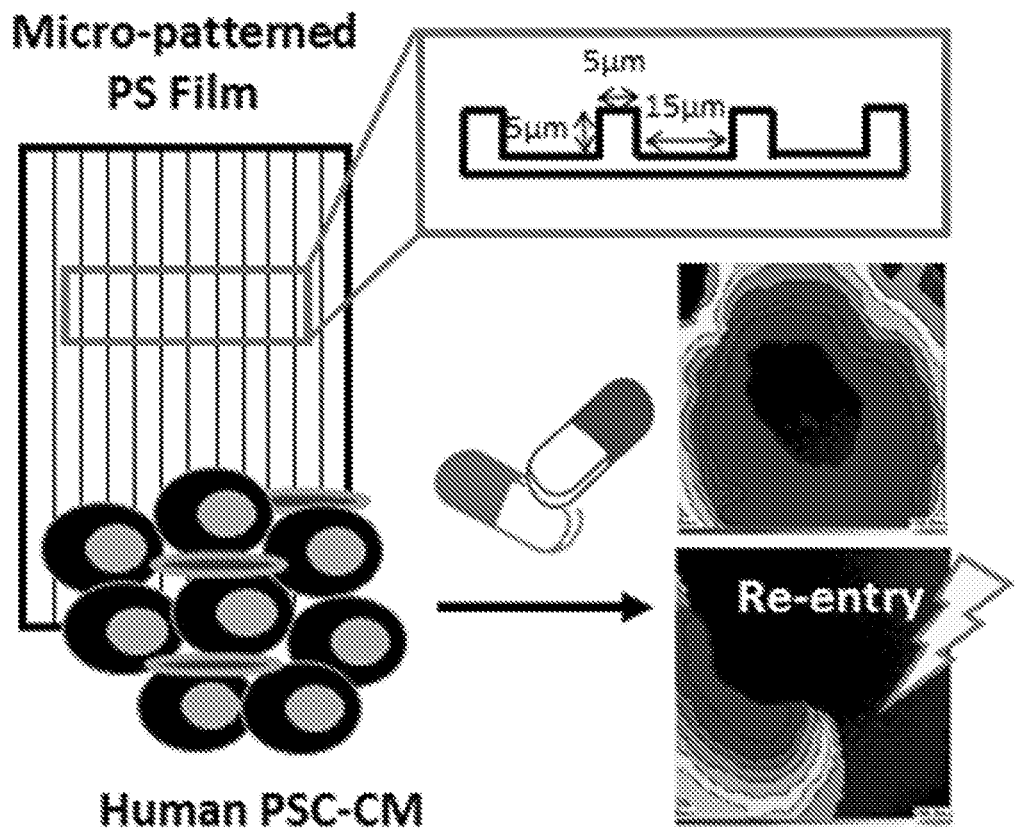
FIG. 1. Schematic illustration of an exemplary substrate in association with an exemplary cardiac anisotropic sheet of cells or monolayer. An exemplary substrate promoting the growth and ordered development of an exemplary anisotropic layer of human cardiac cells (e.g., human ventricular cardiac cells) is shown. Also shown are exemplary isochronal conduction maps showing normal conduction and spiral re-entry.
Figure 2:
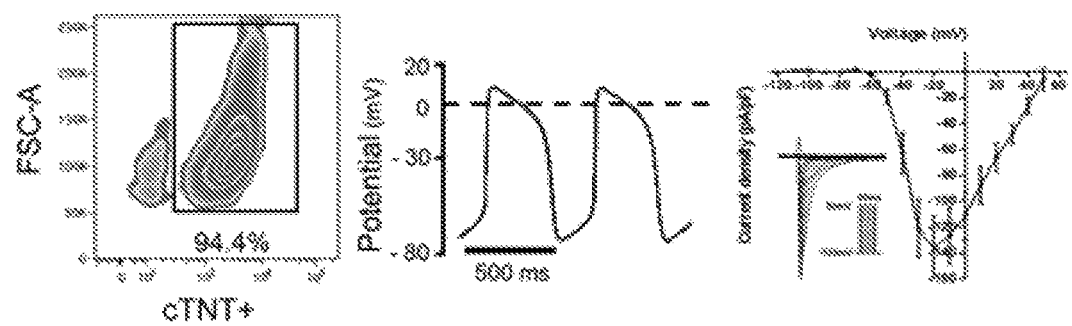
FIG. 2. Engineering Anisotropic Ratio Resembling Native Human Ventricle Using Microgroove Technology. (A) A representative plot of flow cytometric analysis of cTNT+ population generated from HES2 hESCs (left); the majority of the cTNT+ hESC-CMs possessed ventricular (V) AP phenotype as shown by patch clamp action potential (AP) measurement (middle); $I_{Na}$, a major ionic current contributing to the cardiac ventricular action potential is shown to illustrate the electrophysiological integrity of these hESC-VCMs, other ionic currents such as $I_{CaL}$, $I_{f}$, $I_{kr}$, $I_{KATP}$ were also detected (right). (B) An illustrated diagram showing the physical dimensions of the microgroove substrates used (top), brightfield and immunostained microscopic images showing the aligned organization of HES2-VCMs on microgroove substrates (middle; green: cTNT; blue: DAPI), and isochronal maps showing the electrical propagation through anisotropic layers of cells grown on different substrates when being point-stimulated (bottom). (C) Increased anisotropic Ratio (LCV/TCV) of HES2-VCM aligned on L15 substrates compared to L10 anisotropic layers of cells and unaligned random anisotropic layers of cells (top); significant elevation LCV was observed in both L10- and L15-hvCASs (second); no significant difference in AP parameters such as the action potential duration of 90% repolarization, or $APD_{90}$ (third) with AP tracings showing similar depolarization-repolarization patterns (bottom). *$p<0.05$, ***$p<0.001$ (n=4; mean±SD). (D) Success rate was dependent on the % cTNT but plateaued when reaching 70% cTNT-positive hESC-CM population (42 batches of hESC-CM; mean±SEM). (E) hvCASs were further evaluated for electrical stability before subsequent experiments for assessing arrhythmic risk. Representative isochronal conduction maps are given.
Figure 2:
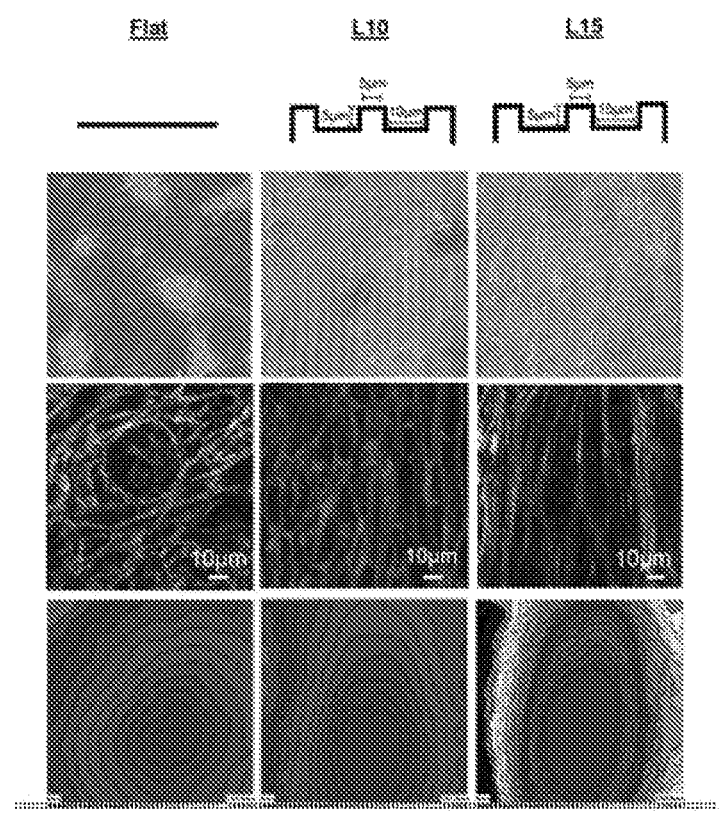
Figure 2:
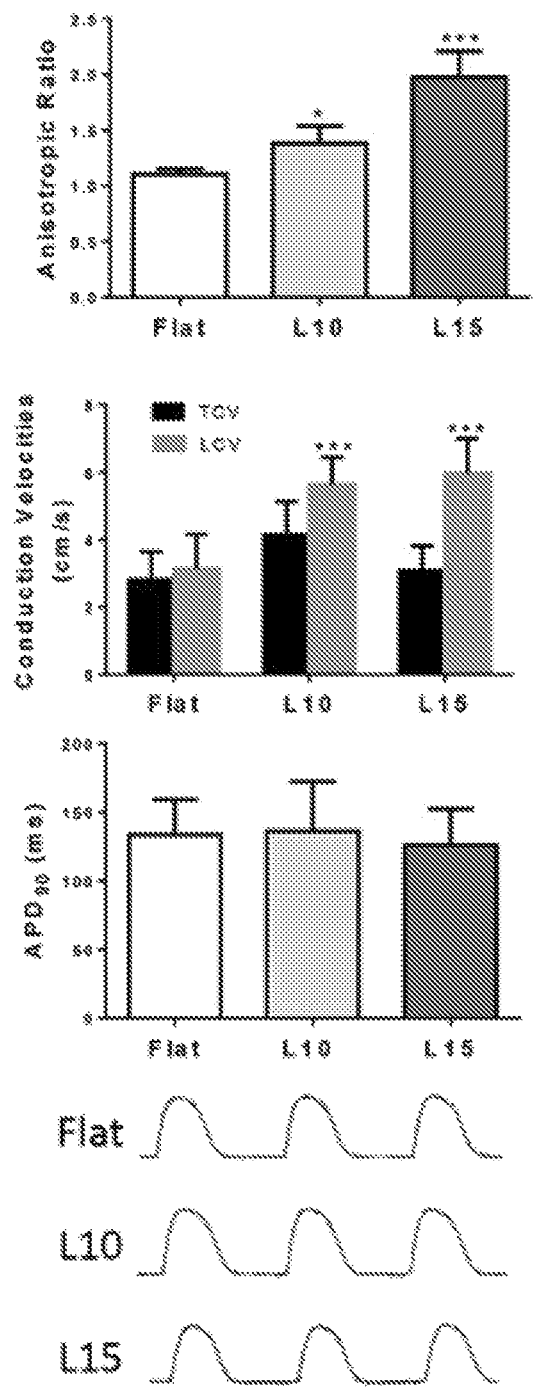
Figure 2:
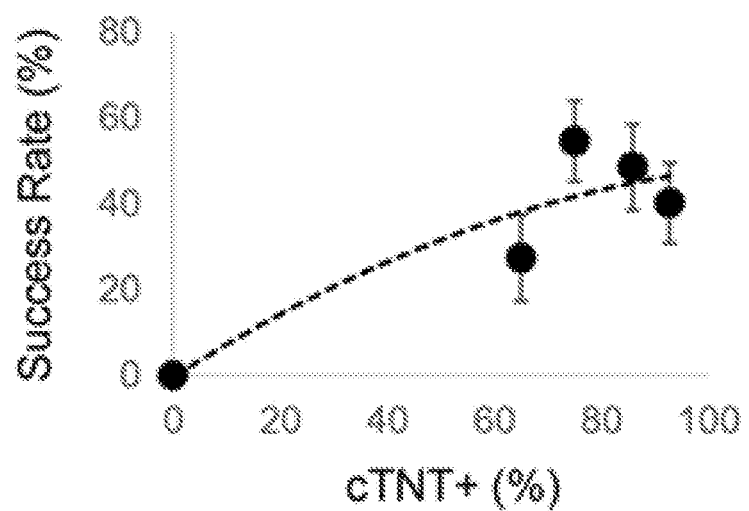
Figure 2:
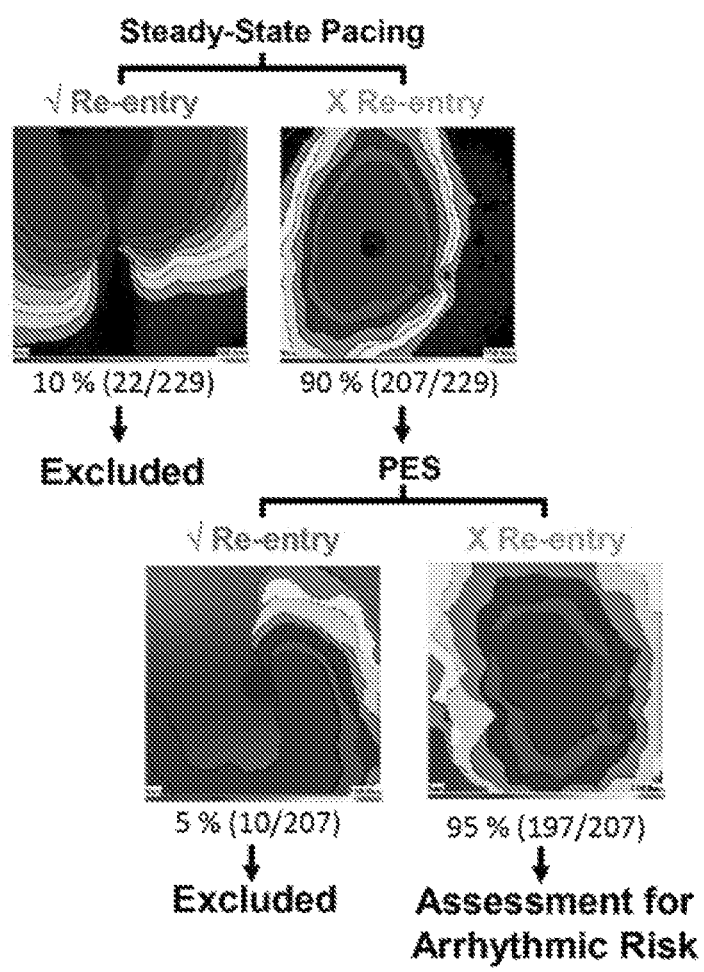

The disclosure provides a class of substrates useful in promoting the ordered growth and development of cardiomyocytes such as ventricular cardiomyocytes, as well as providing the cells themselves. The disclosure also provides methods of producing the cardiomyocytes (e.g., ventricular cardiomyocytes) according to the disclosure. Various aspects of the disclosure are provided in the schematic illustrated in FIG. 1. The technology was developed from research focused on identifying and developing useful and reliable in vitro assays to assess the cardiotoxicity of a wide variety of compounds, such as candidate cardiac drugs as exemplified by anti-arrhythmics. In the course of that research, wrinkled biomimetic substrates were shown to provide topographical cues sufficient to induce cellular alignments of seeded hPSC-vCMs for generating cell sheets or monolayers that reproduce the structural and functional anisotropy seen in the native ventricle to mimic the endogenous electrophysiological profile, including the susceptibility to reentrant arrhythmias.[15-17] Of note, while the biology of single cells dictates their individual intrinsic properties, it is the patterning that determines the multicellular conduction properties of anisotropic layers of cells or monolayers. Consistent with the foregoing, a cell "monolayer" is used herein as an alternative to either "anisotropic sheet" or "anisotropic sheet of cells", unless otherwise indicated. As a first step in developing a reliable screening model, two measures were taken to enhance experimental reproducibility: 1) replacement of multi-scaled wrinkles by fabricated substrates with discrete micro-patterned parameters for geometric consistency; 2) use of hPSC-vCMs derived using a unique ventricular specification protocol, disclosed herein, that yields hPSC-vCMs with well-characterized single-cell properties such as action potential (AP) (FIG. 2A), $Ca^{2+}$ handling and transcriptomic profile[18-20]. The use of hPSC-vCMs yields an example of CAS termed the human ventricular CAS or hvCAS. In comparing the properties of hvCAS on substrates with different dimensions, flat control (which led to random orientation), 10×5×5 (L10) and 15×5×5 (L15) m substrates were tested, leading to the discovery that L15-hvCAS, when point-stimulated, displayed a radiating conduction pattern with an anisotropic ratio or AR of 2.0±0.2 (n=4) that best mimicked the native ventricular electrophysiology (FIG. 2B-C). Of note, AP properties such as the action potential duration of 90% repolarization, or $APD_{90}$ of control-, L10- and L15-hvCASs were indistinguishable, consistent with the notion that the differences in such conduction properties as AR could be attributed to the alignment per se.[15] Immunostaining confirmed the microgroove-induced alignments. Therefore, L15-hvCASs were chosen for the remaining studies. Secondly, specific functional criteria were set for the selection of hvCASs suitable for arrhythmogenicity screening. For a preparation to qualify, a first basic requirement would be to fully capture the physiological range of pacing frequencies (0.5-1.5 Hz). It was noticed that the percentage of qualified hvCASs based on this criterion depended significantly on the percentage of cardiac troponin T (cTNT)-positive hPSC-VCMs in the composition. This dependence plateaued when the percent cTNT was greater than 70% (FIG. 2D), which was therefore chosen for all remaining experiments with hvCASs.

After defining the base material (substrate) and cell composition, initially qualified hvCASs were subjected to the next quality control test of functionality via high-resolution optical electrophysiological assay. FIG. 2E shows that during steady-state pacing at 0.5-3 Hz, 10% (22 of 229 hvCASs) spontaneously displayed reentrant events in the form of spiral waves, which could be attributed to regions of hvCAS that might not have adequately conformed to the micro-pattern. Those developing in vitro tissue cultures displaying reentrant events were discarded from further analyses. The remaining 207 preparations were further subjected to programmed electrical stimulation (PES), a more aggressive clinical protocol to test the susceptibility to arrhythmias in which a first train of 8 pulses (S1) followed by a second train (S2) with progressively shortened S1-S2 interval were given. Five percent (10 of 207 hvCASs) displayed inducible spiral waves and were also excluded. The remaining 197 hvCASs were considered electrically stable and chosen as a baseline for subsequent screening experiments.

In the Cardiac Arrhythmia Suppression Trial (C.A.S.T.) conducted between 1986 and 1998, several "anti-arrhythmics," including flecainide and procainamide, were found to unexpectedly and ironically increase mortality by causing lethal arrhythmias after testing in over 1700 patients.[21] To validate the hvCAS platform disclosed herein, we first screened the effect of the Class Ic anti-arrhythmic flecainide.[22] Upon the addition of flecainide at an effective serum therapeutic concentration (i.e., 0.3 and 1 μM) and beyond (3 μM), significant electrophysiological changes of cellular AP became immediately noticeable. FIG. 3A shows that flecainide potently and dose-dependently slowed the conduction velocity by primarily prolonging $APD_{50}$ as a result of slowed upstrokes, as previously reported in single-cell hiPSC-CM studies.[23] Interestingly, at the multi-cellular level, flecainide at clinical plasma concentrations led to the formation of spiral waves either during steady-state pacing or PES in 24% hvCASs (5 of 21) compared to 6% hvCASs (2 of 32) for the vehicle control (Tyrode's solution) performed with the same batches of hvCASs (FIG. 4), translating into a 4.0-fold increase in the incidence rate or risk for arrhythmias (FIG. 3F-G). The chirality and frequency of the spiral waves observed did not appear to show any obvious correlation (Table 1), however. For the first time, therefore, the human arrhythmogenicity of flecainide could be visualized and quantified in vitro. This result was comparable to the 3.4-fold increase in the arrhythmic risk by flecainide over placebo control, as reported in C.A.S.T.[21]

TABLE 1

A Summary of the Frequency and Chirality of Re-entries Triggered by Drug or Vehicle Treatment.

| Treatment | No. of Re-entry | | | Chirality of Re-entry | | | | Frequency (Mean ± SD) |
|---|---|---|---|---|---|---|---|---|
| | 1$^{st}$ dose | 2$^{nd}$ dose | 3$^{rd}$ dose | Clock-wise | Anticlock-wise | Figure-of-eight | Multi-origin | |
| FLE | 4[a] | 1[a] | 0 | 1 | 3 | 1 | 0 | 1.92 ± 0.37 |
| PROC | 1[a] | 2 | 0 | 0 | 3 | 0 | 0 | 1.53 ± 0.42 |
| TOC | 0 | 1[a] | 1 | 1 | 0 | 1 | 0 | 1.34 ± 0.52 |
| TERF | 0 | 0 | 4 | 1 | 3 | 0 | 0 | 1.04 ± 0.31 |
| CISA | 2[a] | 4[a] | 3 | 3 | 5 | 0 | 1 | 1.18 ± 0.40 |
| TYR | 2 | 0 | 0 | 0 | 2 | 0 | 0 | 2.2 ± 0 |
| DMSO | 2 | 2 | 5 | 3 | 3 | 2 | 1 | 1.50 ± 0.38 |

[a]Data represents re-entrant events that occurred at dose(s) within the therapeutic concentration for a given drug.

Figure 3:
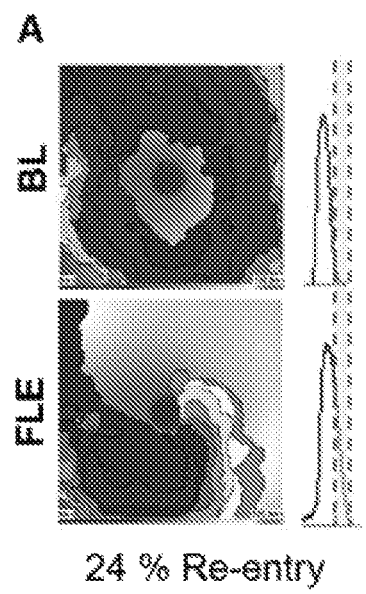
FIG. 3. Measurements of AP Properties on hvCAS in Response to Drug Treatment. Representative isochronal maps illustrating normal electrical propagation and arrhythmic reentrant events as spiral wave upon point stimulation (top left), AP traces at baseline (BL) and after drug treatment (blue dotted-line: $APD_{90}$ at baseline; red dotted-line: $APD_{90}$ after drug treatment; top right), percentage change of $APD_{90}$ (middle) and average rise time (bottom) normalized to baseline conditions after the addition of (A) flecainide (FLE), (B) procainamide (PROC), (C) tocainide (TOC), (D) terfenadine (TERF), (E) cisapride (CISA) and (F) aspirin (ASP) when electrically paced at 1 Hz. *$p<0.05$, $p<0.01$, *$p<0.001$ compared with the baseline (mean±SD). (G) Incidence rate of spiral wave formation in hvCAS treated with FLE, PROC, TOC, TERF, CISA, ASP and vehicle controls (VC; Tyrode's (TYR) or DMSO). Reentrant events were boxed in red with those that occurred at doses within therapeutic concentration highlighted in yellow. (H) The arrhythmic risk of each tested drug was calculated by normalizing the incidence of arrhythmia associated the drug to the corresponding VC. All drugs with indicated TdP risk (FLE, PROC, TERF and CISA) showed an elevated risk while the TdP-negative TOC and ASP presented a lower risk compared to the respective VC.
Figure 3:
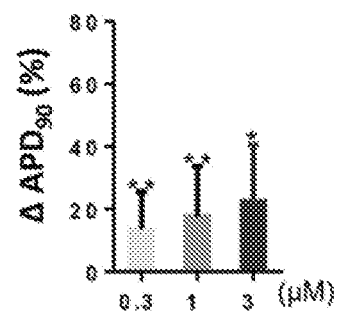
Figure 3:
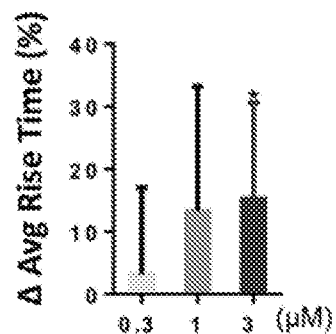
Figure 3:
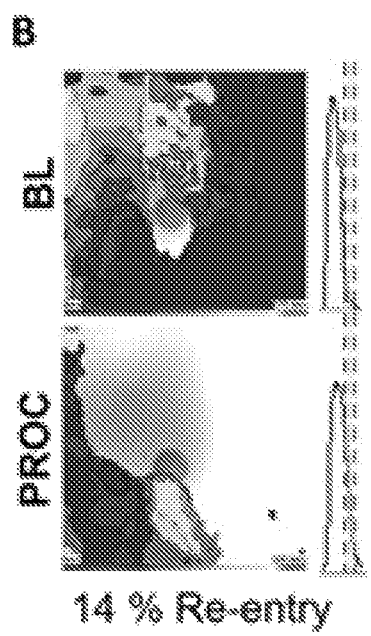
Figure 3:
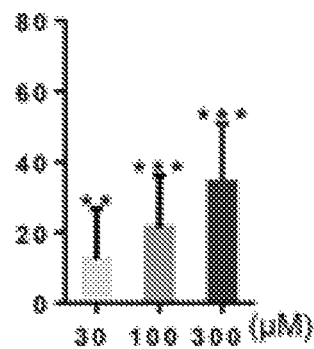
Figure 3:
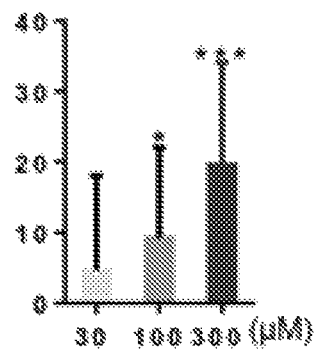
Figure 3:
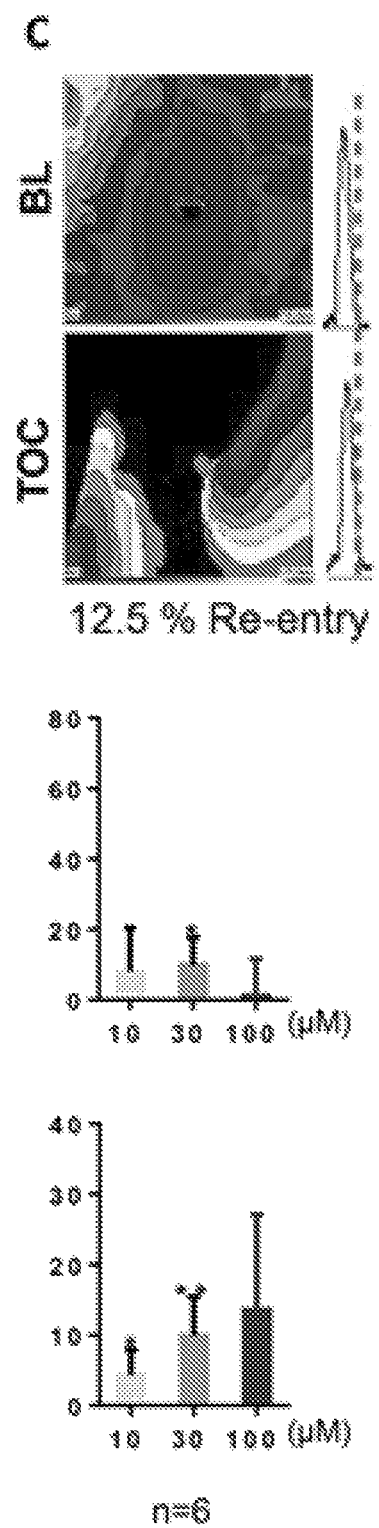
Figure 3:
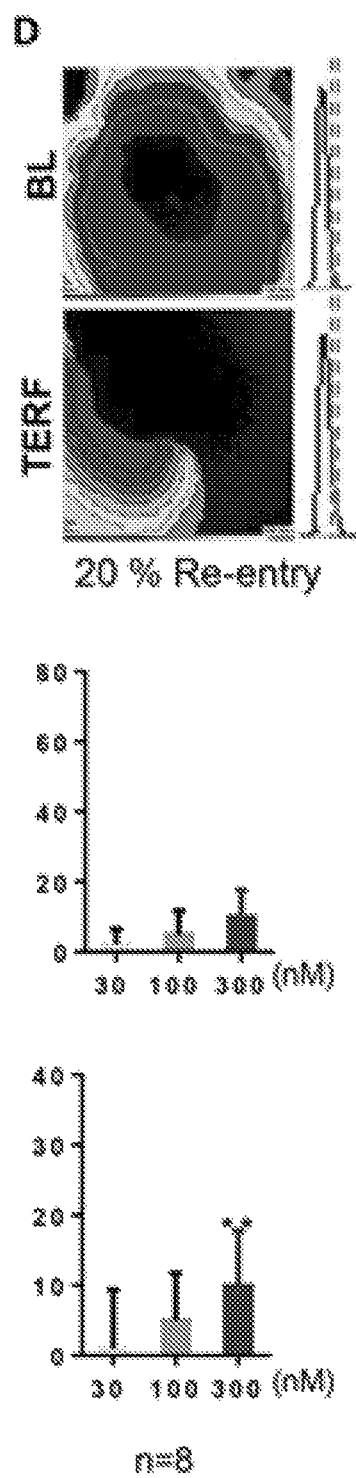
Figure 3:
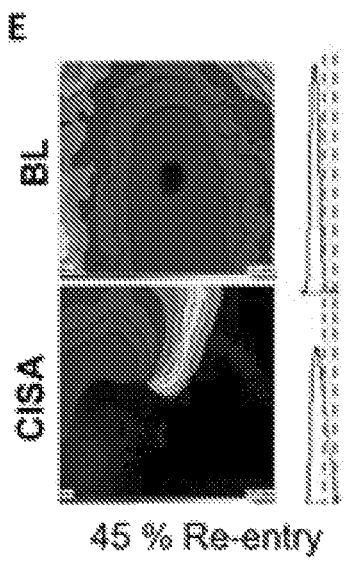
Figure 3:
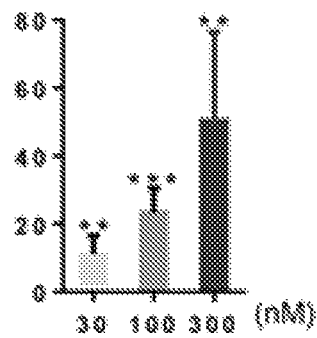
Figure 3:
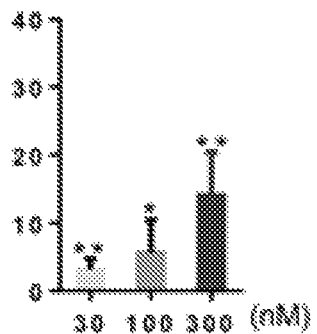
Figure 3:
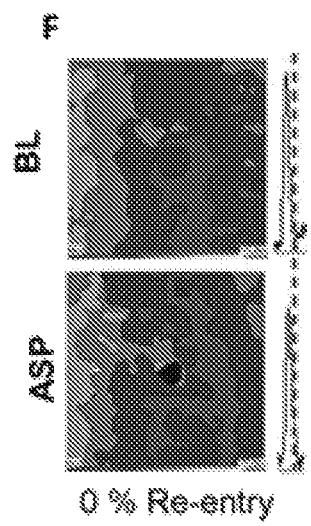
Figure 3:
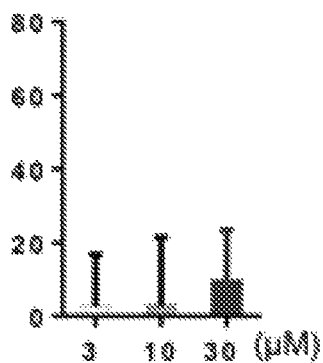
Figure 3:
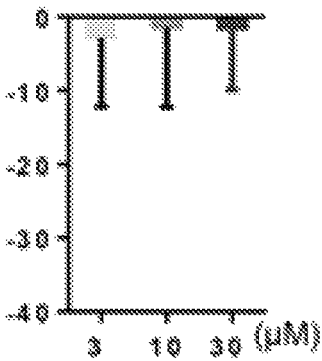
Figure 3:
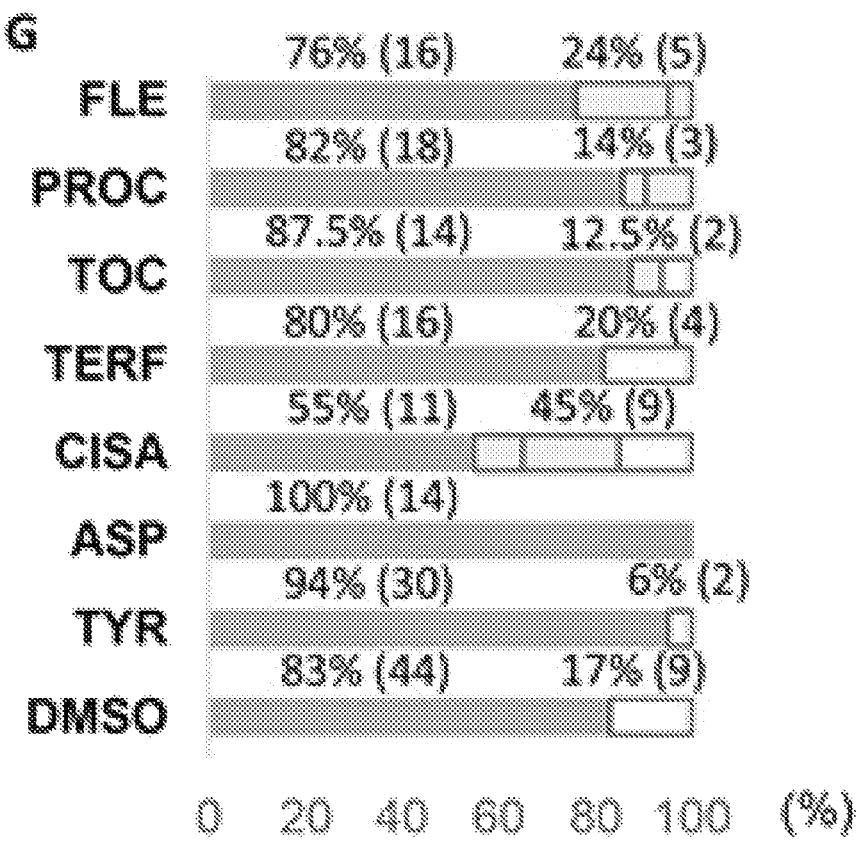
Figure 3:
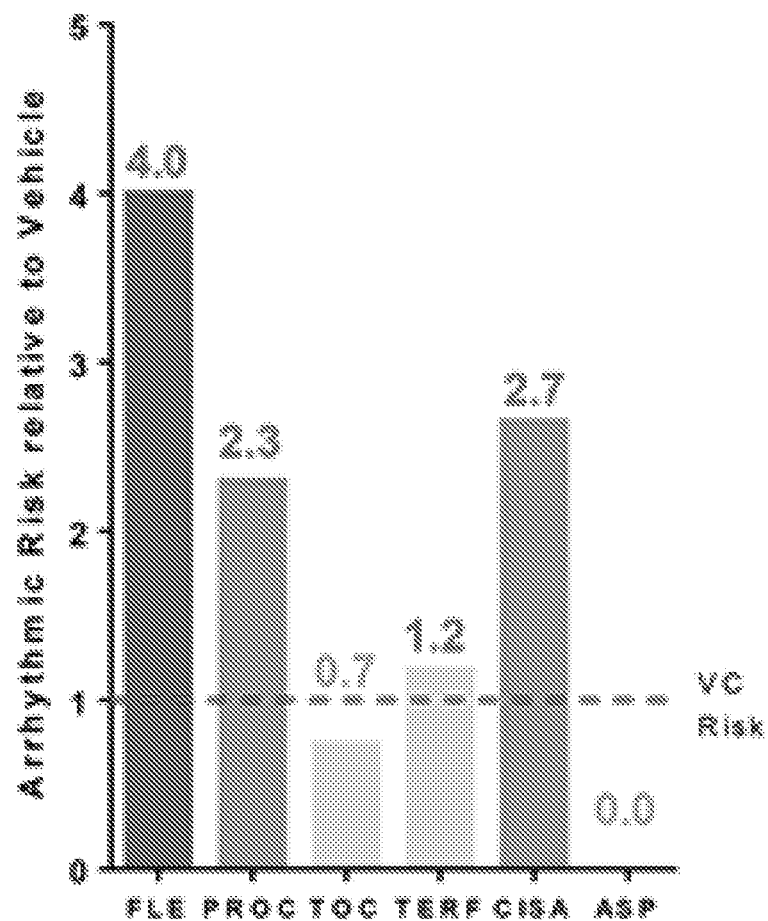
Figure 4:
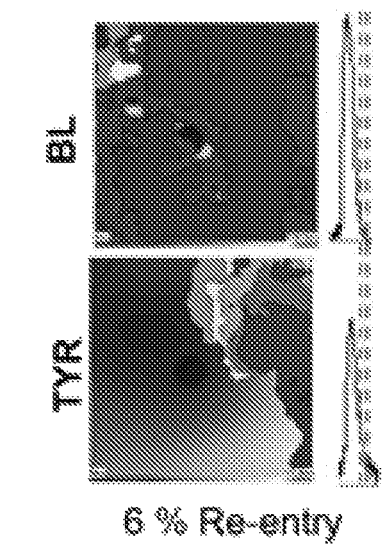
FIG. 4. Measurements of AP Properties on hvCAS in Response to Vehicle Controls. Representative isochronal maps illustrating normal electrical propagation and arrhythmic re-entrant events as spiral wave upon point stimulation (top left), AP traces at baseline (BL) and after drug treatment (top right), percentage change of $APD_{90}$ (middle) and average rise time (bottom) normalized to baseline conditions after the addition of (A) Tyrode's solution (TYR) and (B) DMSO when electrically paced at 1 Hz. *$p<0.05$ compared with the baseline (mean±SD).
Figure 4:
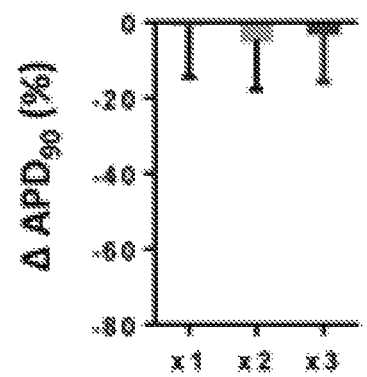
Figure 4:
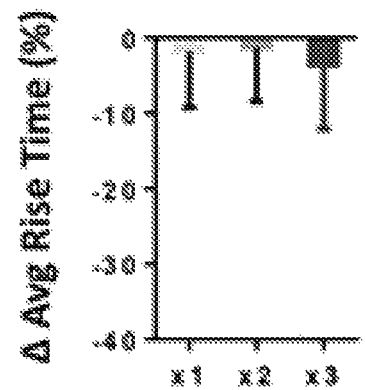
Figure 4:
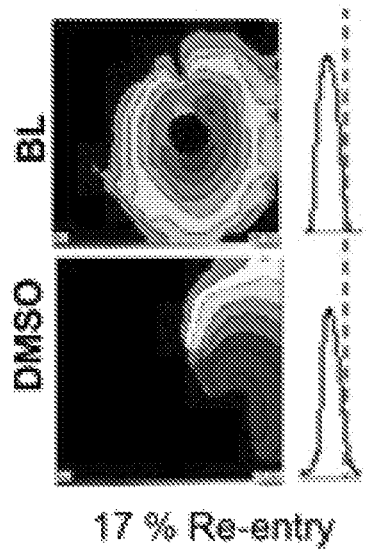
Figure 4:
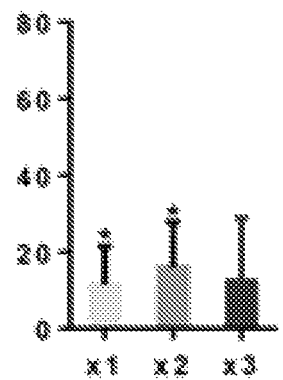
Figure 4:
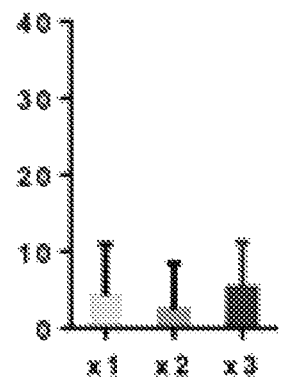

The hvCAS-based test was then extended to the Class 1a and 1b anti-arrhythmics procainamide and tocainide with and without known clinical TdP risks, respectively, according to CredibleMeds. Dose-dependent APD$_{90}$ prolongation as a result of both slower upstrokes and decays was seen upon the addition of procainamide, while the effect of tocainide was essentially indiscernible from the vehicle (DMSO) controls (FIG. 3). As for reentrant events, the associated arrhythmic risks for procainamide and tocainide, after normalizing to the corresponding vehicle controls, were 2.3- and 0.7-fold increases, respectively. Aspirin, without known TdP risk, was used as negative control and led to neither AP changes nor the formation of spiral waves (0% or n=0 of 14).

The arrhythmogenicity of terfenadine, a non-sedating anti-histamine which was one of the widely used drugs worldwide before its withdrawal in 1998, was also assessed. At relatively low doses (30 and 100 nM), no apparent effects on AP were observed. Accordingly, no reentrant events (0 of 16) were observed. In stark contrast, reentrant events were observed at the highest dose tested (300 nM) beyond the therapeutic range, leading to a modest 1.2-fold increase in risk compared to the vehicle control (DMSO). This was consistent with clinical observations that terfenadine-related arrhythmic events were often seen in patients with hepatic dysfunction or co-medication that interferes with the drug metabolizing enzyme CYP3A4.[24] Indeed, clinical TdP has been associated with a serum terfenadine concentration of 120 nM, justifying the occurrence of reentrant events only at the dose (300 nM) beyond this in the current hvCAS model.[25]

The arrhythmogenicity of cisapride, a gastrointestinal prokinetic agent that was restricted after 2000 due to an association with life-threatening arrhythmias, was also assessed using hvCASs. A total of 9 re-entrant events, or a 2.7-fold increase in arrhythmic risk relative to the DMSO vehicle control, was observed. This was consistent to the doubling or tripling of the risk of arrhythmia or sudden death associated with cisapride during hospitalization in a nested case-control study.[26] Interestingly, similar incidences of re-entry were observed at all doses (30, 100 and 300 nM). Such an apparent lack of dose-dependent responses mirrored those observed in clinical data.[26, 27]

As specified in the current preclinical (ICH S7b) and clinical (ICH E14) guidelines, an in vitro hERG channel assay and an in vivo QT study, followed by a thorough QT study upon passing both preclinical tests, is the recommended standard adopted in the pharmaceutical field for the past decade. However, various lines of evidence indicated that these tests were suboptimal in estimating the clinical TdP risk, leading to drug safety concern, unwarranted drug attrition and high cost.[28] First, not all drugs that inhibit the hERG channel lead to TdP. For instance, verapamil is a potent hERG blocker but does not cause QT prolongation nor TdP.[29] Secondly, previous studies have shown that QT prolongation is not solely responsible for any pro-arrhythmic effects and could even be anti-arrhythmic under certain circumstances (e.g., absence of triangulation).[30, 31] Indeed, drugs such as ranolazine, which delays repolarization, appear to be reasonably safe from causing TdP.[32] These highlight the need to develop better screening platforms for assessing TdP risk, such as the hvCAS platform presented herein. By standardizing the materials including substrate, cells, composition and functionality-based selection criteria, we have minimized the number of variables to develop a systematic approach for visualizing arrhythmias as multi-cellular reentrant events and quantifying proarrhythmic risks. The selected hvCASs were electrically stable and the results disclosed herein were entirely consistent with the known pharmacological profiles of the drugs investigated.

Disclosed herein is a demonstration, for the first time, of successful detections of the torsadogenicity of the failed C.A.S.T. drug flecainide, procainamide and the withdrawn terfenadine in vitro without human subjects. By enabling the prediction of proarrhythmic risks prior to clinical trials, the disclosed hvCAS model is expected to facilitate the development of new therapeutic regimes, in vitro models for electrical disorders and precision screening. Subsequent efforts to automate the screening process with robotics and engineering are expected to further enhance the through-put, sensitivity and accuracy of the assays.

EXAMPLES

Example 1 hESC Culture, Directed Cardiac Differentiation, and Formation of hvCAS

Human embryonic cell (hESC) line HES2 (ESI, NIH code ES02) was maintained in its pluripotent state at 37° C. in a humidified normoxic incubator equilibrated with 5% $CO_2$, in feeder- and serum-free feeder-free cell culture medium for human embryonic stem cells and induced pluripotent stem cells condition (mTeSR™1; Stemcell Technologies, Inc.) supplemented with hESC-qualified solubilized basement membrane matrix secreted by Engelbreth-Holm-Swarm mouse sarcoma cells (354277: BD Biosciences) (Matrigel™; 354277; BD Biosciences). Directed cardiac differentiation of hESC cultures were procured according to an established protocol that can efficiently generate cardiac cells of the ventricular (V) subtype at high yield and purity[18].

hESC cultures at 80-90% confluence were dissociated into single cells with accutase (A11105; Gibco) and subsequently cultured in suspension in ultralow attachment plates (3471; Corning) under hypoxic (5% $O_2$/5% $CO_2$) conditions for 8 days. A feeder-free cell culture medium for human embryonic stem cells and induced pluripotent stem cells (Stemcell Technologies, Inc., cat. no. 85850)-based, i.e., mTeSR™-1-based, medium supplemented with Rho kinase (ROCK) inhibitor (1254; R&D), bone morphogenic protein-4 (BMP4; PHC9534, Gibco) and solubilized basement membrane matrix secreted by Engelbreth-Holm-Swarm mouse sarcoma cells (MATRIGEL; 354277; BD Biosciences) was employed for the first 24 hours and shifted to serum-free complete medium (StemPro®-34 SFM complete medium; 10639-011; Gibco) containing ascorbic acid, L-alanyl-L-glutamine dipeptide (GlutaMAX™; 35050-061; Gibco), BMP4, and Activin-A (PHC9654; Gibco) for the next 72 hours. Cell clusters were cultured for another 72 hours in serum-free complete medium (StemPro®-34 SFM complete medium; 10639-011; Gibco) containing ascorbic acid, L-alanyl-L-glutamine dipeptide (GlutaMAX™; 35050-061; Gibco), and the Wnt inhibitor IWR-1 (BML-WN103-0005; Enzo Life Sciences) before the cultures were transferred to normoxic conditions on day 8. Cardiospheres were then maintained in serum-free complete medium (StemPro®-34 SFM complete medium; 10639-011; Gibco) supplemented with ascorbic acid and replenished every 3-4 days until day 15-22, when the hESC-vCM were dissociated using a 2-step collagenase-trypsin method. Cells were then seeded at 250,000/cm² in solubilized basement membrane matrix secreted by Engelbreth-Holm-Swarm mouse sarcoma cells (MATRIGEL; 354277; BD Biosciences)—coated polystyrene substrate. The hvCAS were maintained initially using high glucose DMEM-based medium (11965; Gibco) containing heat-inactivated FBS (10%; 10270; Gibco), L-alanyl-L-glutamine dipeptide (GlutaMAX™; 1×; 35050; Gibco), MEM Non-Essential Amino Acids (1×; 11140-050; Gibco) for 2 days, followed by replenishment using RPMI 1640 medium (72400; Gibco)/B-27 (17504; Gibco) every second day. The hvCAS were cultured for at least 7 days to allow the formation of intercellular electrical junctions prior to electrophysiological examinations for drug testing.

Example 2

Fabrication of Microgroove Substrates

Polydimethylsiloxane (PDMS) mold was generated with the use of photolithography to create L10 or L15 with dimensions 10 µm (R)×5 µm (D)×5 µm (W) or 15 µm (R)×5 µm (D)×5 µm (W), respectively. The microscopic line features were then hot-embossed onto polystyrene (PS) shrink film (Clear Shrink Dinks®) at 180° C. Substrates were then UVO-treated for 8 minutes (Jetlight UVO) and finally sterilized by submersion in 70% ethanol, followed by UV treatment for at least 20 minutes before use.

Example 3

Optical Mapping and Electrophysiology of hvCAS hvCAS preparations were loaded with di-8-ANEPPS (10 µM; D-3167; Molecular Probes)/Pluronic F-12 (0.04%;

P-3000MP; Life Technologies) for 1 hour at 37° C. in DMEM-F12, followed by incubation at room temperature (RT) for 15 minutes in Blebbistatin (50 µM, B0560; Sigma-Aldrich) in Tyrode's solution. Tyrode's solution consists of 140 mM NaCl, 5 mM KCl, 1 mM $MgCl_2$, 1 mM $CaCl_2$, 10 mM D-glucose, and 10 mM HEPES at pH 7.4 to minimize potential interference of optical mapping signals by motion artifacts. The dye-loaded hvCAS preparations were bathed in Tyrode's solution which was maintained at 35-37° C. using a culture dish incubator (Warners Instruments). High-resolution optical mapping of AP and conduction properties was performed using a MiCam Ultima (SciMedia, CA, USA) with a 1× objective and a 1× condensing lens to yield a 10 mm by 10 mm field of view. Fluorescence imaging was performed using a halogen light filtered by a 515±35 nm band-pass excitation filter and a 590 nm high-pass emission filter. Data were collected at a sampling rate of 200 Hz and analyzed using BVAna software (SciMedia). A programmable stimulator (Master8; AMPI, Israel) was enrolled to deliver pacing stimuli (10V, 10-ms pulse duration) via a unipolar point-stimulation electrode (Harvard Apparatus, MA, USA) placed perpendicular to the hvCAS surface.

Example 4

Electrophysiological Studies

A point stimulation was applied at the center of an hCML preparation following the schematic illustration (FIG. 2E) and steady state pacing (10 ms, 10 V) was first applied from 0.5 Hz through to 3 Hz (i.e., 30 to 180 bpm) with 0.5 Hz increments, unless there was a loss of 1:1 capture using Master-8 (AMPI, Israel). A standard (S1-S2) programmed electrical stimulation (PES) protocol was then introduced to further evaluate arrhythmogenicity, similar to what has been previously described[15]. A train of eight S1 stimuli was delivered at 1.5 Hz followed by a premature extra stimulus (S2) with S1-S2 interval initiated at 550 ms and consecutively shortened in steps of 50 ms until capture failed. The S1-S2 interval was then increased by 20 ms afterward, followed by 2-ms decrements until the effective refractory period (ERP), defined as the maximum S1-S2 interval that failed to lead to AP propagation, was achieved.

Example 5

Assessing Drug-Induced Arrhythmogenicity

A set of selection criteria was strictly followed before an hvCAS was employed for subsequent drug testing procedures to ensure fair comparison. In particular, the selection criteria included (1) observation of a consistent propagation signal across the whole field of view, (2) a maximum capture frequency of at least 1.5 Hz and (3) no re-entry at baseline. Drugs were then added at three cumulative doses to cover the therapeutic range and HERG $IC_{50}$ was determined using a conventional technique known in the art.[33] All drugs were purchased from Sigma-aldrich (MO, USA). Vehicle-control was done in parallel to correct for possible batch-to-batch variation in susceptibility to arrhythmia; Tyrode's solution was used for flecainide (F6777), procainamide (P9391) and aspirin (A2093); DMSO was used for tocainide (T0202), terfenadine (T9652) and cisapride (C4740). Steady-state pacing and PES were repeated, as described above, for each dose unless re-entry occurred before the highest dose was applied. Action potential parameters and conduction properties were subsequently analyzed using Clampfit, with $APD_{90}$ defined as the time from the peak to 90% repolarization. Data are individually presented as mean±SD and statistically compared using Student's t-test with p<0.05 considered statistically significant.

REFERENCES

[1] P. B. Watkins, Clinical pharmacology and therapeutics 2011, 89, 788.
[2] J. L. Stevens, T. K. Baker, *Drug discovery today* 2009, 14, 162.
[3] R. R. Shah, L. M. Hondeghem, Heart rhythm: the official journal of the Heart Rhythm Society 2005, 2, 758.
[4] L. Eckardt, W. Haverkamp, M. Borggrefe, G. Breithardt, *Cardiovascular research* 1998, 39, 178.
[5] S. M. Paul, D. S. Mytelka, C. T. Dunwiddie, C. C. Persinger, B. H. Munos, S. R. Lindborg, A. L. Schacht, *Nat Rev Drug Discov* 2010, 9, 203.
[6] M. J. Janse, T. Opthof, A. G. Kleber, *Cardiovascular research* 1998, 39, 165.
[7] A. M. Brown, *Cell calcium* 2004, 35, 543.
[8] W. S. Redfern, L. Carlsson, A. S. Davis, W. G. Lynch, I. MacKenzie, S. Palethorpe, P. K. Siegl, I. Strang, A. T. Sullivan, R. Wallis, A. J. Camm, T. G. Hammond, *Cardiovascular research* 2003, 58, 32.
[9] G. A. Gintant, *Pharmacology & therapeutics* 2008, 119, 199.
[10] M. K. Jonsson, T. A. van Veen, M. J. Goumans, M. A. Vos, G. Duker, P. Sartipy, *Expert opinion on drug discovery* 2009, 4, 357.
[11] K. O. Lui, M. W. Stachel, D. K. Lieu, R. A. Li, L. Bu, *Drug Discovery Today: Disease Models* 2012, 9, e199.
[12] Z. Ma, S. Koo, M. A. Finnegan, P. Loskill, N. Huebsch, N. C. Marks, B. R. Conklin, C. P. Grigoropoulos, K. E. Healy, *Biomaterials* 2014, 35, 1367.
[13] S. Peng, A. E. Lacerda, G. E. Kirsch, A. M. Brown, A. Bruening-Wright, *Journal of pharmacological and toxicological methods* 2010, 61, 277.
[14] O. Scheel, S. Frech, B. Amuzescu, J. Eisfeld, K. H. Lin, T. Knott, *Assay and drug development technologies* 2014, 12, 457.
[15] J. Wang, A. Chen, D. K. Lieu, I. Karakikes, G. Chen, W. Keung, C. W. Chan, R. J. Hajjar, K. D. Costa, M. Khine, R. A. Li, *Biomaterials* 2013, 34, 8878.
[16] A. Chen, D. K. Lieu, L. Freschauf, V. Lew, H. Sharma, J. Wang, D. Nguyen, I. Karakikes, R. J. Hajjar, A. Gopinathan, E. Botvinick, C. C. Fowlkes, R. A. Li, M. Khine, *Advanced materials* (Deerfield Beach, Fla.) 2011, 23, 5785.
[17] J. I. Luna, J. Ciriza, M. E. Garcia-Ojeda, M. Kong, A. Herren, D. K. Lieu, R. A. Li, C. C. Fowlkes, M. Khine, K. E. McCloskey, *Tissue engineering. Part C, Methods* 2011, 17, 579.
[18] Z. Weng, C. W. Kong, L. Ren, I. Karakikes, L. Geng, J. He, M. Z. Chow, C. F. Mok, W. Keung, H. Chow, A. Y. Leung, R. J. Hajjar, R. A. Li, C. W. Chan, *Stem cells and development* 2014, 23, 1704.
[19] J. Liu, J. D. Fu, C. W. Siu, R. A. Li, *Stem Cells* 2007, 25, 3038.
[20] E. Poon, W. Keung, Y. M. Liang, R. Ramalingam, B. Yan, S. Zhang, A. Chopra, J. Moore, A. Herren, D. K. Lieu, H. S. Wong, Z. Weng, O. T. Wong, Y. W. Lam, G. F. Tomaselli, C. Chen, K. R. Boheler, R. A. Li, *Circ Cardiovasc Genet* 2015.
[21] D. S. Echt, P. R. Liebson, L. B. Mitchell, R. W. Peters, D. Obias-Manno, A. H. Barker, D. Arensberg, A. Baker, L. Friedman, H. L. Greene, et al., *The New England journal of medicine* 1991, 324, 781.
[22] J. Tamargo, A. Capucci, P. Mabo, *Drug safety* 2012, 35, 273.
[23] J. K. Gibson, Y. Yue, J. Bronson, C. Palmer, R. Numann, *Journal of pharmacological and toxicological methods* 2014, 70, 255.
[24] R. L. Woosley, Y. Chen, J. P. Freiman, R. A. Gillis, *Jama* 1993, 269, 1532.
[25] B. P. Monahan, C. L. Ferguson, E. S. Killeavy, B. K. Lloyd, J. Troy, L. R. Cantilena, Jr., *Jama* 1990, 264, 2788.
[26] S. Hennessy, C. E. Leonard, C. Newcomb, S. E. Kimmel, W. B. Bilker, *British journal of clinical pharmacology* 2008, 66, 375.
[27] C. Enger, C. Cali, A. M. Walker, *Pharmacoepidemiology and drug safety* 2002, 11, 477.
[28] G. Gintant, *Pharmacology & therapeutics* 2011, 129, 109.
[29] F. De Ponti, E. Poluzzi, A. Cavalli, M. Recanatini, N. Montanaro, *Drug safety* 2002, 25, 263.
[30] L. M. Hondeghem, *Heart rhythm: the official journal of the Heart Rhythm Society* 2008, 5, 1210.
[31] L. M. Hondeghem, L. Carlsson, G. Duker, *Circulation* 2001, 103, 2004.
[32] N. Hawwa, V. Menon, *American journal of cardiovascular drugs: drugs, devices, and other interventions* 2013, 13, 5.
[33] R. Regenthal, M. Krueger, C. Koeppel, R. Preiss, *J Clin Monit Comput* 1999, 15, 529

All publications and patents mentioned in the application are herein incorporated by reference in their entireties or in relevant part, as would be apparent from context. Various modifications and variations of the disclosed subject matter will be apparent to those skilled in the art without departing from the scope and spirit of the disclosure. Although the disclosure has been described in connection with specific preferred embodiments, it should be understood that the claimed subject matter should not be unduly limited to such specific embodiments. Indeed, various modifications of the described modes for making or using the disclosed subject matter that are obvious to those skilled in the relevant field(s) are intended to be within the scope of the following claims.

What is claimed is:

1. A method of assessing whether a compound exhibits cardiotoxicity comprising:
    (a) contacting an anisotropic layer of ventricular cardiac cells comprising at least 70% troponin T+ cardiomyocytes on a microfabricated substrate comprising microgrooves oriented along a single axis of the substrate with a compound, wherein microgrooves have a width of 15 μm and a depth 5 μm and wherein spacing between microgrooves is 5 μm;
    (b) electrically stimulating the anisotropic layer of cardiac cells at one or more points by a programmed electrical stimulation comprising delivering a train of eight S1 stimuli at 1.5 Hertz, followed by a premature extra stimulus S2 with an S1-S2 interval initiated at 550 milliseconds (ms) and consecutively shortened in steps of 50 ms until capture fails, at which point the S1-S2 interval is increased by 20 ms, followed by 2 ms decrements until an effective refractory period is achieved when the maximum S1-S2 interval fails to lead to action potential propagation and a radiating conduction pattern with an anisotropic ratio of at least 1.8 in response to electrical point stimulation;
    (c) detecting an electrical signal propagation in the anisotropic layer of cardiac cells;

(d) determining whether the electrical signal propagation is an arrhythmic reentrant event; and
(e) identifying the compound as exhibiting cardiotoxicity if the electrical signal propagation is an arrhythmic reentrant event.

2. The method of claim 1, wherein the anisotropic layer of cells comprises patient- or disease-specific cardiac cells derived from a human.

3. The method of claim 1, wherein the microfabricated substrate is polystyrene.

4. The method of claim 1, wherein the anisotropic layer of cardiac cells is stimulated at one point.

5. The method of claim 4, wherein the stimulation is 5-30 volts with a pulse duration of 5-30 milliseconds.

6. The method of claim 5, wherein the stimulation is 10 volts with a pulse duration of 10 milliseconds.

7. The method of claim 1, wherein a compound is determined to exhibit cardiotoxicity if the compound induces a spiral electrical propagation wave in the anisotropic layer of cardiac cells.

8. The method of claim 1, wherein the compound is a Class 1A, Class 1B or Class 1C anti-arrhythmic compound.

9. A method for assessing whether a compound is cardiotoxic, the method comprising
(a) contacting an anisotropic layer of ventricular cardiac cells comprising at least 70% troponin T+ cardiomyocytes on a microfabricated substrate comprising microgrooves oriented along a single axis of the substrate with a compound, wherein microgrooves have a width of 15 μm and a depth 5 μm and wherein spacing between microgrooves is 5 μm; and
(b) determining the compound is cardiotoxic if the compound induces an arrhythmic reentrant event in the cardiac cells after administering a programmed electrical stimulation comprising a train of eight S1 stimuli delivered at 1.5 Hertz followed by a premature extra stimulus S2 with S1-S2 interval initiated at 550 milliseconds (ms) and consecutively shortened in steps of 50 ms until capture fails, at which point the S1-S2 interval is increased by 20 ms, followed by 2 ms decrements until the effective refractory period is achieved when the maximum S1-S2 interval fails to lead to action potential propagation.

10. The method of claim 9, wherein the cardiac cells are attached to the microfabricated substrate.

11. The method of claim 9, wherein the anisotropic layer of cardiac cells are healthy cells.

12. The method of claim 9, wherein the anisotropic layer of cardiac cells are genetically, chemically, physically or electrically disposed to a cardiac arrhythmia or disease.

13. The method of claim 12, wherein the cardiac arrhythmia or disease is or results from Long QT syndrome, Brugada syndrome, genetic heart disease, amyloidosis, progeria, diabetic coma, jellyfish intoxication, hyperthyroidism, Yellow Fever, Chagas disease, aortic valve regurgitation, prescription drug abuse, Rett syndrome, myocarditis, tricuspid atresia, Lyme disease, Churg-Strauss syndrome, forms of heart disease or failure involving arrhythmia, enlarged heart, broken heart syndrome, thyroid nodules, atrioventricular canal defect, cholera, mitral valve stenosis, multiple system atrophy (MSA), snoring, mitral valve prolapse, amniotic fluid embolism, gangrene, aplastic anemia, congenital heart disease in adults, heat exhaustion, Graves' disease, cardiomyopathy, premature ventricular contractions, Bradycardia, fatigue, tachycardia, dizziness, or shortness of breath.

\* \* \* \* \*